US010112860B1

(12) United States Patent
Kobayashi et al.

(10) Patent No.: US 10,112,860 B1
(45) Date of Patent: Oct. 30, 2018

(54) THERMOCHEMICAL REGENERATION WITH FUEL ADDITIONS

(71) Applicants: Hisashi Kobayashi, Bedford, NY (US); Kuang-Tsai Wu, Irvine, CA (US)

(72) Inventors: Hisashi Kobayashi, Bedford, NY (US); Kuang-Tsai Wu, Irvine, CA (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 0 days.

(21) Appl. No.: 15/643,559

(22) Filed: Jul. 7, 2017

Related U.S. Application Data

(60) Provisional application No. 62/362,649, filed on Jul. 15, 2016.

(51) Int. Cl.
| | |
|---|---|
| *C03B 5/237* | (2006.01) |
| *C01B 3/36* | (2006.01) |
| *F27D 17/00* | (2006.01) |
| *F27B 3/26* | (2006.01) |
| *F27D 99/00* | (2010.01) |

(52) U.S. Cl.
CPC ............. *C03B 5/237* (2013.01); *F27B 3/266* (2013.01); *F27D 17/004* (2013.01); *F27D 99/0033* (2013.01); *C01B 3/36* (2013.01); *F27D 2017/007* (2013.01)

(58) Field of Classification Search
CPC ...... Y02P 40/59; Y02P 40/535; Y02P 20/124; F27D 17/004; F27D 99/0033; F23C 2900/99011; C03B 5/237; Y10S 423/06; Y10S 423/09; C01B 2203/148; C01B 3/382; C01B 3/36; C01B 2203/142; C01B 3/34
See application file for complete search history.

(56) References Cited

U.S. PATENT DOCUMENTS

| 6,113,874 A * | 9/2000 | Kobayashi ................ C01B 3/34 252/373 |
| 2007/0059234 A1 | 3/2007 | Agnihotri et al. |
| 2016/0305656 A1 | 10/2016 | Wu et al. |
| 2016/0370005 A1 | 12/2016 | Wu et al. |
| 2017/0059250 A1 | 3/2017 | Kobayashi |

FOREIGN PATENT DOCUMENTS

| GB | 756191 | 8/1956 |
| NO | 2016168443 | 10/2016 |

\* cited by examiner

*Primary Examiner* — Amber R Orlando
*Assistant Examiner* — Syed T Iqbal
(74) *Attorney, Agent, or Firm* — Donald T. Black

(57) ABSTRACT

Operation of a thermochemical regenerator combustion system in which fuel is fed with furnace flue gas into the regenerators to reduce the oxygen content and optionally to establish a reducing atmosphere in both cycles in which the regenerators operate.

14 Claims, 3 Drawing Sheets

THERMOCHEMICAL REGENERATION WITH FUEL ADDITIONS

RELATED APPLICATIONS

This application claims the benefit of U.S. Provisional Application Ser. No. 62/362,649, filed on Jul. 15, 2016, which is incorporated herein by reference.

FIELD OF THE INVENTION

The present invention relates to combustion in furnaces such as glassmelting furnaces wherein material is fed into the furnace and is heated and/or melted by the heat of combustion that occurs within the furnace.

BACKGROUND OF THE INVENTION

U.S. Pat. No. 6,113,874 discloses heat recovery methods useful with furnaces employing regenerators wherein a stream of combustion products formed in the furnace is passed through a first regenerator to heat the first regenerator and cool the combustion products, and then a portion of the cooled combustion products is combined with fuel to form a mixture which is passed through a second heated regenerator and where it undergoes an endothermic reaction to form syngas that then passes into the furnace and is combusted.

The present invention is an improvement in the methods disclosed in that patent, whereby it has unexpectedly been found that the efficient heat recovery afforded by these methods can be improved and other benefits described herein can be realized. In particular, the present invention encourages the establishing and maintaining reducing conditions in both of the aforementioned regenerators, thereby providing advantages described herein.

BRIEF SUMMARY OF THE INVENTION

One aspect of the present invention is a method of carrying out combustion in a furnace, comprising
(A) combusting fuel in a furnace to produce gaseous combustion products which contain oxygen; and
(B) alternately
(1) (i) passing a portion of the gaseous combustion products out of the furnace into a first chamber, feeding hydrocarbon fuel into the first chamber, and reacting the hydrocarbon fuel in the first chamber with oxygen present in the gaseous combustion products to reduce the concentration of oxygen in the first chamber and to produce a gaseous reaction mixture containing oxygen and from zero up to 20,000 ppm of carbon monoxide;
(ii) passing the gaseous reaction mixture out of the first chamber into and through a cooled first regenerator to heat the first regenerator and cool said gaseous reaction mixture;
(iii) passing at least part of said cooled gaseous reaction mixture from said first regenerator, and fuel, into a heated second regenerator and, in the second regenerator, reacting the gaseous reaction mixture and the fuel in an endothermic reaction in the second regenerator to form syngas comprising hydrogen and CO; and
(iv) passing said syngas formed in the second regenerator into said furnace and combusting the syngas with one or more oxidant streams injected into said furnace; and
(2) (i) passing a portion of the gaseous combustion products out of the furnace into a second chamber, feeding hydrocarbon fuel into the second chamber, and reacting the hydrocarbon fuel in the second chamber with oxygen present in the gaseous combustion products to reduce the concentration of oxygen in the second chamber and to produce a gaseous reaction mixture containing oxygen and from zero up to 20,000 ppm of carbon monoxide;
(ii) passing the gaseous reaction mixture out of the second chamber into and through a cooled second regenerator to heat the second regenerator and cool said gaseous reaction mixture;
(iii) passing at least part of said cooled gaseous reaction mixture from said second regenerator, and fuel, into a heated first regenerator and, in the first regenerator, reacting the gaseous reaction mixture and the fuel in an endothermic reaction in the first regenerator to form syngas comprising hydrogen and CO; and
(iv) passing said syngas formed in the first regenerator into said furnace and combusting the syngas with one or more oxidant streams injected into said furnace.

In a preferred aspect of the invention, the gaseous combustion products that are passed alternately into the first and second chambers contain more than 5 vol. % of oxygen, and the gaseous reaction mixture that is formed alternately in the first and second chambers contains up to 5 vol. % of oxygen and contains from zero up to 3000 ppm of carbon monoxide.

In another preferred aspect of the invention, the gaseous reaction mixture that is formed alternately in the first and second chambers contains less than 20,000 ppm of oxygen and at least 1000 ppm of carbon monoxide.

In a further preferred aspect of the present invention, the cooled gaseous reaction mixture that is formed alternately in the first and second chambers is reacted, before it is passed to exhaust into a stack or is passed into the reforming bed, with oxygen containing gas such as air or oxygen to convert carbon monoxide, hydrogen and hydrocarbons present in the cooled gaseous reaction mixture to carbon dioxide and water to reduce the concentration of carbon monoxide to less than 500 ppm, preferably less than 200 ppm, more preferably less than 100 ppm.

Preferably, the method is carried out wherein the combustion in the furnace in steps (A) and (B) is carried out under oxy-fuel combustion conditions, that is, with oxidant comprising at least 50 vol. % oxygen.

As used herein, gas compositions expressed as "ppm" are parts per million by volume, wet basis.

As used herein, a composition is considered to contain oxygen if oxygen is detected in the composition, and/or if thermodynamic equilibrium calculations indicate that oxygen is present in the composition, for example in small amounts even under reducing conditions with a significant CO concentration.

DETAILED DESCRIPTION OF THE INVENTION

Figure 1:
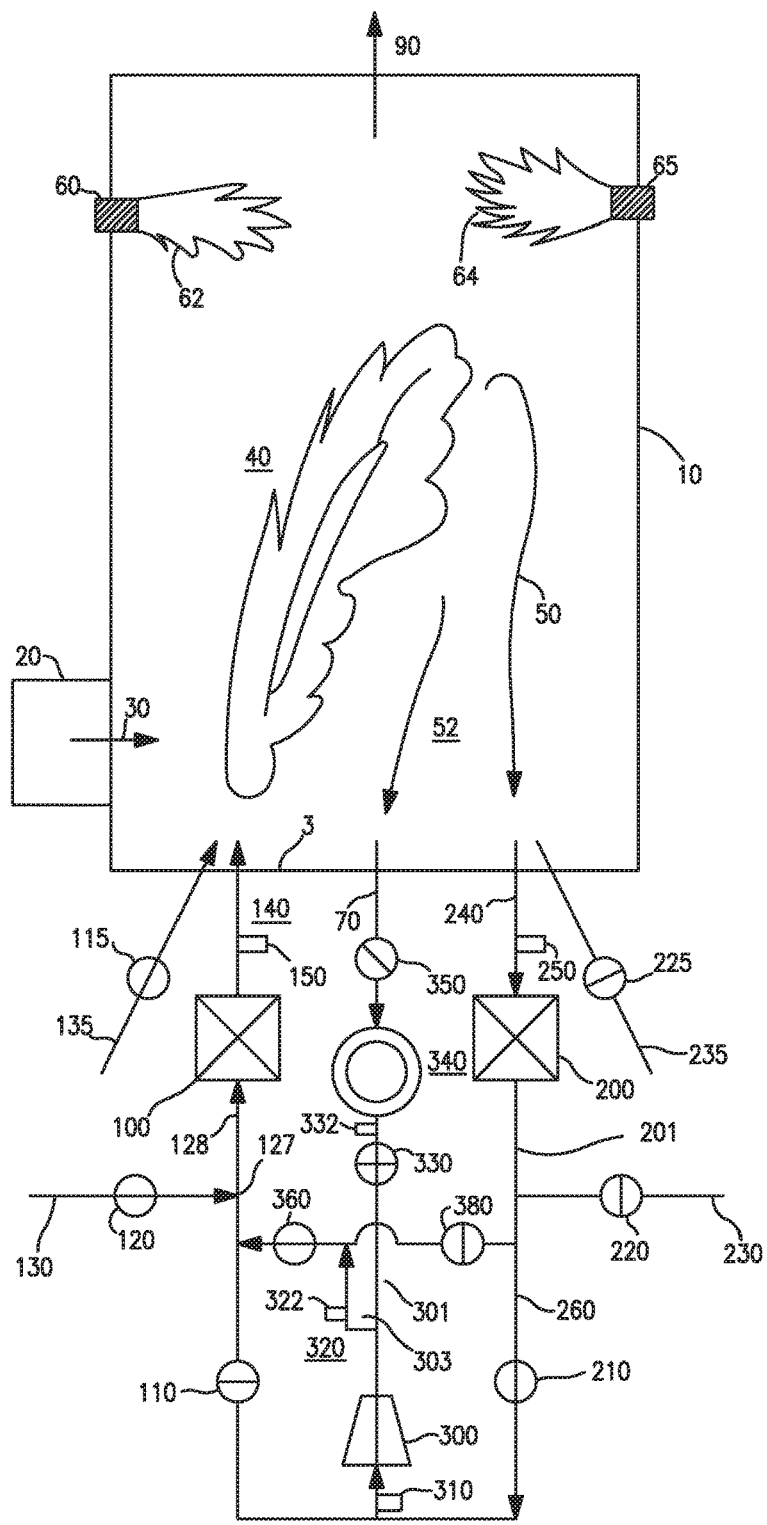
FIGS. 1-3 are schematic representations of different aspects of the present invention.

The invention is described herein in particular detail with respect to a preferred type of furnace, namely one that employs a heat recovery process which recaptures usable heat from high temperature flue gas exhaust streams. This heat recovery process proceeds in two cycles, which are referred to herein as the flue cycle and the reforming cycle. These two cycles are performed alternatingly in two or more checker-filled regenerators. The heat recovery process is preferably carried out in association with furnaces and other combustion devices which employ "oxy-fuel" combustion processes, i.e. combustion of fuel with gaseous oxidant comprising an oxygen content of at least 50 vol. % oxygen, and preferably at least 80 vol. % oxygen, more preferably at least 90 vol. % oxygen, and even at least 99 vol. % oxygen, because the flue gases produced by oxy-fuel combustion have higher $H_2O$ and $CO_2$ concentrations, both of which promote the endothermic reforming reactions that are utilized in the method of this invention.

During the flue cycle, flue gas that is formed by combustion in the furnace and containing products of combustion such as carbon dioxide and water vapor, and containing excess oxygen (typically up to 1 to 5 vol. % or even higher), is specially treated in accordance with the present invention to reduce the excess oxygen or remove the oxygen, and the resulting gaseous reaction mixture is passed into and through a first regenerator to extract and store heat in checker beds in this regenerator and thereby cool the reaction mixture. Then, optionally but preferably when the excess oxygen is removed, the cooled reaction mixture is treated after it emerges from the checker beds, by adding oxygen to convert incompletely oxidized compounds such as carbon monoxide to carbon dioxide and water vapor.

Then, in the reforming cycle, from the cooled and optionally treated reaction mixture that emerges from the first regenerator, a portion (which is referred to herein as Recycled Flue Gas or RFG) is fed into another (second) regenerator and mixed with a stream of fuel (referred to herein as Reforming Fuel or RF). In the following description, pure methane ($CH_4$) is described as reforming fuel for purposes of illustration. Other satisfactory fuels include any combustible gas, gas mixture, or vaporized liquid fuels including, but not limited to, natural gas, propane, and LPG (liquefied petroleum gas).

In the reforming cycle, the RFG/Reforming Fuel mixture enters the second regenerator in which the checker has already been heated, as described herein, and flows through it towards the furnace. The temperature of the RFG/RF mixture passing through the second regenerator continues to increase by extracting heat from the already pre-heated checker. As the RFG/RF mixture passes through the second regenerator, it reaches a temperature at which reforming reactions begin to occur and continue to occur, producing products including $H_2$ and CO. The reforming reactions are endothermic and the heat needed to promote the reforming reactions is absorbed from the heated checker. The reforming reactions produce a product mixture which typically comprises one or more components such as such as $H_2$, CO, soot, and unreacted gases comprising $H_2O$, $CO_2$ and $CH_4$. The gaseous composition thus produced may also be called "syngas" herein. The mixture of gaseous products and any soot emerges from the second regenerator into the furnace wherein the combustible components are combusted with oxidant to provide thermal energy for heating and/or melting material in the furnace. This combustion may combust and gasify a portion of the products inside a flame boundary, but eventually all of the combustible products in the syngas are either oxidized directly by the injected oxidant and/or by excess $O_2$ in furnace flue gas to $CO_2$ and $H_2O$, or gasified to CO and $H_2$ firstly by $H_2O$ and $CO_2$ in the furnace flue, then subsequently oxidized directly by the injected oxidant and/or by excess O2 in furnace flue gas to CO2 and H2O.

After a length of time, the operation of the two regenerators (including the treatment of flue gas to remove any excess oxygen) is reversed, i.e., the regenerator that was used in the flue cycle is switched to the reforming cycle, and the regenerator that was used in the reforming cycle is switched to the flue cycle. After a further period of time, the operation of the two regenerators is reversed again. The timing of the reversals can be determined by elapsed time, or by other criteria such as the temperature of the gas stream exiting from the regenerator that is in the flue cycle. The reversal process is carried out according to a predetermined mechanism and plan, wherein valves are sequenced to open and close based on specific timings.

The operation and control of the present invention is described below in conjunction with FIGS. 1 to 3. An end-port fired glass furnace (10) fitted with two regenerators in end wall (3) is used as an example. However, the present invention can be practiced in a furnace equipped with at least two thermochemical regenerators of present invention and other burners and regenerators of different designs, including but not limited to air heating regenerators.

As shown in FIG. 1, end-port glass furnace (10) has a feed station (20) where feed material (30) comprising solid glassmaking materials (known as batch and/or cullet) are charged into the furnace to be heated and melted. The flow of molten glass out of furnace (10) is represented as (90). The furnace (10) is equipped with first regenerator (100) on the furnace left side and second regenerator (200) on the furnace right side. Vertical cross-sectional views of the two regenerators are displayed in more detail in FIGS. 2 and 3.

Figure 2:
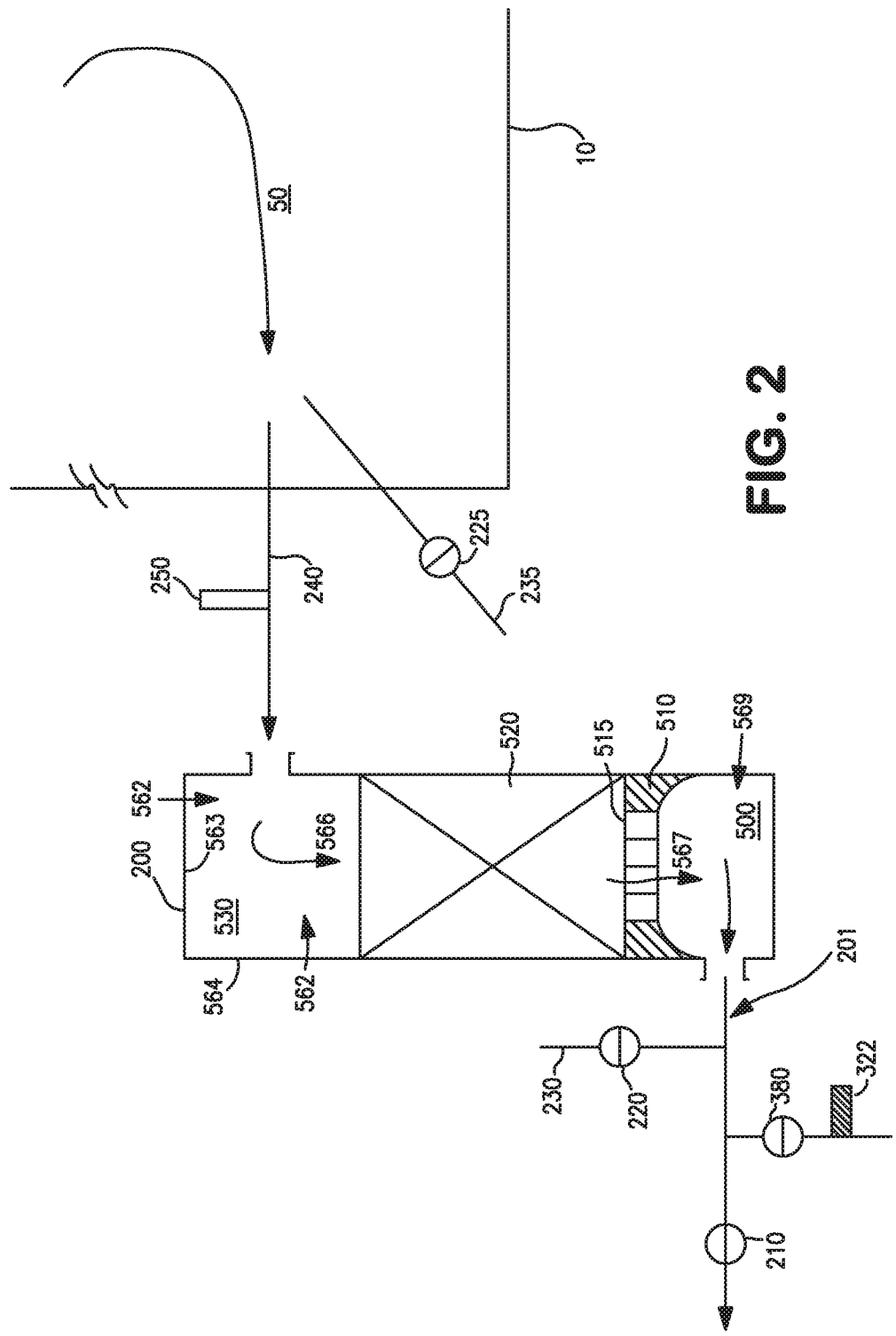

As seen in FIG. 2, regenerator (200) is in the flue cycle wherein gaseous combustion products, as flue gas stream (50) from the interior of furnace (10) enters port neck (240) and then flows into chamber (530) of regenerator (200) past an optional oxygen analyzer (250).

The flue gas stream includes major combustion products $CO_2$ and $H_2O$, and some excess oxygen typically from 1 to 5 vol. % and above 5 vol. % in some applications. This level of oxygen can be provided by feeding sufficient oxygen into the furnace to provide a stoichiometric excess of oxygen relative to the combustible products that are in the furnace. To reduce the amount of oxygen in the flue gas (50) after it enters chamber (530) while still maintaining some oxygen present, or to establish that the checker bed environment in chamber (200) is under reducing conditions, a suitable amount of fuel is fed into the chamber (530) above the checker pack (520) or into the port neck (240). Satisfactory fuels to feed include any liquid or gaseous hydrocarbon, preferably methane or natural gas. The feeding of the fuel is shown as (562). The fuel can be fed for example by injecting it through lances located through the chamber's top surface (crown) (563) or through a wall of the chamber (564), or a combination of both, or through any another accessible walls surrounding the chamber (530) above the checker pack and in the port neck. It is preferred to use fuel injector(s) optimized in design such that for a desired extent of reducing the oxygen content of the flue gas the amount of the injected fuel is minimized. As the temperature of the incoming flue gas (50) is typically in excess of 1800 F, when the injected fuel is mixed with the incoming flue gas stream in chamber (530) the oxygen in the flue gas (50) is partially or fully consumed by autogenous oxidation reactions between the injected fuel and the oxygen at the high temperatures of the flue gas. The resultant gaseous reaction mixture (566) enters the top of the checker pack (520).

For the case of reducing but not eliminating the oxygen content in the gaseous reaction mixture (566) relative to the incoming gaseous combustion products (50), sufficient fuel is added into chamber (530) so that the oxygen content is reduced to less than 5 vol. % oxygen, preferably to 0.5 to 2 vol. % oxygen. If carbon monoxide forms or is present in mixture (566), the amount thereof is up to 3000 ppm, preferably up to 1000 ppm.

For the case of creating reducing conditions in checker pack (520), sufficient fuel is added into chamber (530) so that the oxygen content present is reduced to less than 20,000 ppm, and carbon monoxide is also present in an amount greater than 1000 ppm. Hydrogen and other hydrocarbon species are present. An amount of unreacted fuel may also be present. Preferably the carbon monoxide concentration in this case is between 1000 ppm and 50,000 ppm, more preferably between 1000 ppm and 10,000 ppm. Preferably the oxygen content present is reduced to less than 1,000 ppm. The whole checker pack (520) thus is under reducing conditions even though the TCR regenerator (200) is at this point undergoing the flue cycle. As the checker bed of the other regenerator (100) (which at this point is in the reforming cycle as described herein) is also under reducing conditions, the result is that the heat recovery checkers are under reducing conditions for both the reforming and the flue cycles.

The exothermic oxidization reactions that occur between the injected fuel (562) and the excess oxygen in the flue gas (50), may be expected to cause the temperature of the resultant gaseous reaction mixture (566) to be higher than the temperature of the flue gas (50). A large portion of this additional heat may be recovered by checker pack (520) through heat storage in checker materials.

In addition, nitrogen oxides (also referred to as NOx) in the flue gas stream (50) can be reduced in the regenerator (200) by chemical interaction with the injected fuel or with the reducing atmosphere in checker pack (520).

The gaseous reaction mixture (566) heats checkers in checker pack (520) as it flows through passages between the checkers within regenerator (200), and enters chamber bottom space (500) as stream (567) through gas passages (515) supported on arch (510) which also supports the weight of the whole bed of checkers. Regenerators for glass melting furnaces typically operate under negative pressure relative to the atmospheric pressure. Some ambient air may leak into regenerator (200) and react with the oxidizable components in the gaseous reaction mixture (566) and the concentration of the oxidizable components in stream (567) may be less than that in the gaseous reaction mixture (566).

For the case that stream (567) is reducing, it is preferred to completely oxidize the oxidizable components in this stream (567), to minimize and preferably completely burn out especially the CO that is present, before any portion of this stream is exhausted into conduit (201). Preferably, this oxidation or burnout step lowers the carbon monoxide content of the gas stream to less than 500 ppm, preferably less than 200 ppm, and more preferably less than 100 ppm. The preferred manner of achieving this result is to inject oxidant (569) at ambient or elevated temperature into bottom space (500) under the arch (510) and in the corresponding space (400) shown in FIG. 3 in the alternate cycle of the method. This burnout oxidant should be supplied in sufficient amount in order to completely oxidize (burn out) even low concentrations of CO and excess fuel contained in stream (567), which is enhanced by mixing intimately with the gas stream (567). If the temperature of the gas stream (567) is too low for sufficient burnout of the carbon monoxide, $H_2$, and fuel, the oxidant (569) may be preheated to temperature above ambient, such as 100 C to 500 C. For example, a hot oxygen lance, as described in U.S. Pat. No. 8,425,870, which has superior mixing capability and is suitable for destroying ppm levels of carbon monoxide and unburned fuels can be used. Preferred oxidant (569) for this step includes air and is more preferably a composition containing at least 90 vol. % oxygen.

The flow rate of the injected fuel (562) should be carefully metered such that its amount is sufficient to reduce the amount of excess oxygen to a desired amount, or so that for the case of creating a reducing condition in the checker pack it is more than sufficient to react with all the excess oxygen in the flue gas (50) that is fed into chamber (530). Hydrogen, other hydrocarbons and additional unreacted fuel (i.e., "excess fuel") may exist in stream (566) and the amount of this excess fuel is determined by how fuel-rich one intends to render the checker bed environment. For example, if the desired environment in checker pack (520) is more fuel rich conditions, then more excess fuel (562) is injected. Alternatively, if a slightly fuel-rich environment is preferred, then the flow rate of the injected fuel is set so that only a minor amount of fuel is left after burnout of all the excess oxygen in the stream (566).

To more accurately control the injection rates of fuel (562) and oxidant (569), a high temperature oxygen sensor may be installed at the crown within chamber (530) or at a suitable wall location in space (500) to monitor the oxygen concentrations in chamber (530) or in space (500), respectively. Additionally, a gas analyzer may be installed in space (500) to measure carbon monoxide and unburned fuel concentrations in gas stream (567). The amount of fuel (562) that is required may be estimated by using the measured O2 concentrations at the oxygen analyzer, and fine-tuned by observing the carbon monoxide and fuel concentrations measured by the gas analyzer. The carbon monoxide and fuel concentrations measured by the gas analyzer may also be applied, together with other process information, to determine the amount of oxidant (569) that is required to be fed.

As seen in FIG. 1, a portion (52) of the flue gases produced in furnace (10) may be by-passed to conduit (70) through a partially opened valve (350) then enters stack (340) to exhaust, by which is meant that it does not re-enter the furnace but instead is discharged to the atmosphere and/or conveyed to one or more other stations for storage and/or further treatment or any combination of such destinations. For maximum heat recovery, it is preferred that valve (350) is closed so that essentially all the furnace flue gas (50) goes to regenerators (200) and (100).

As seen in FIGS. 1 and 2, the cooled gas stream (201) exits the regenerator (200) in conduit (260), passes through an open valve (210) and oxygen sensor (310), and then enters the suction-side of blower (300). The majority of this gas stream (301) leaving the pressure-side of the blower passes through a damper (330) then a flow meter (332), and finally is directed into stack (340) through which this gas leaves the system to exhaust as defined herein. Optionally the gas stream may be treated with air pollution control devices to reduce dust, NOx and SOx prior to being directed into stack (340). A portion (303) of the gas stream is recycled to the bottom of regenerator (100) by passing through conduit (320) and valve (360). This is Recycled Flue Gas (RFG). Its flow is metered by a flow meter (322).

Figure 3:
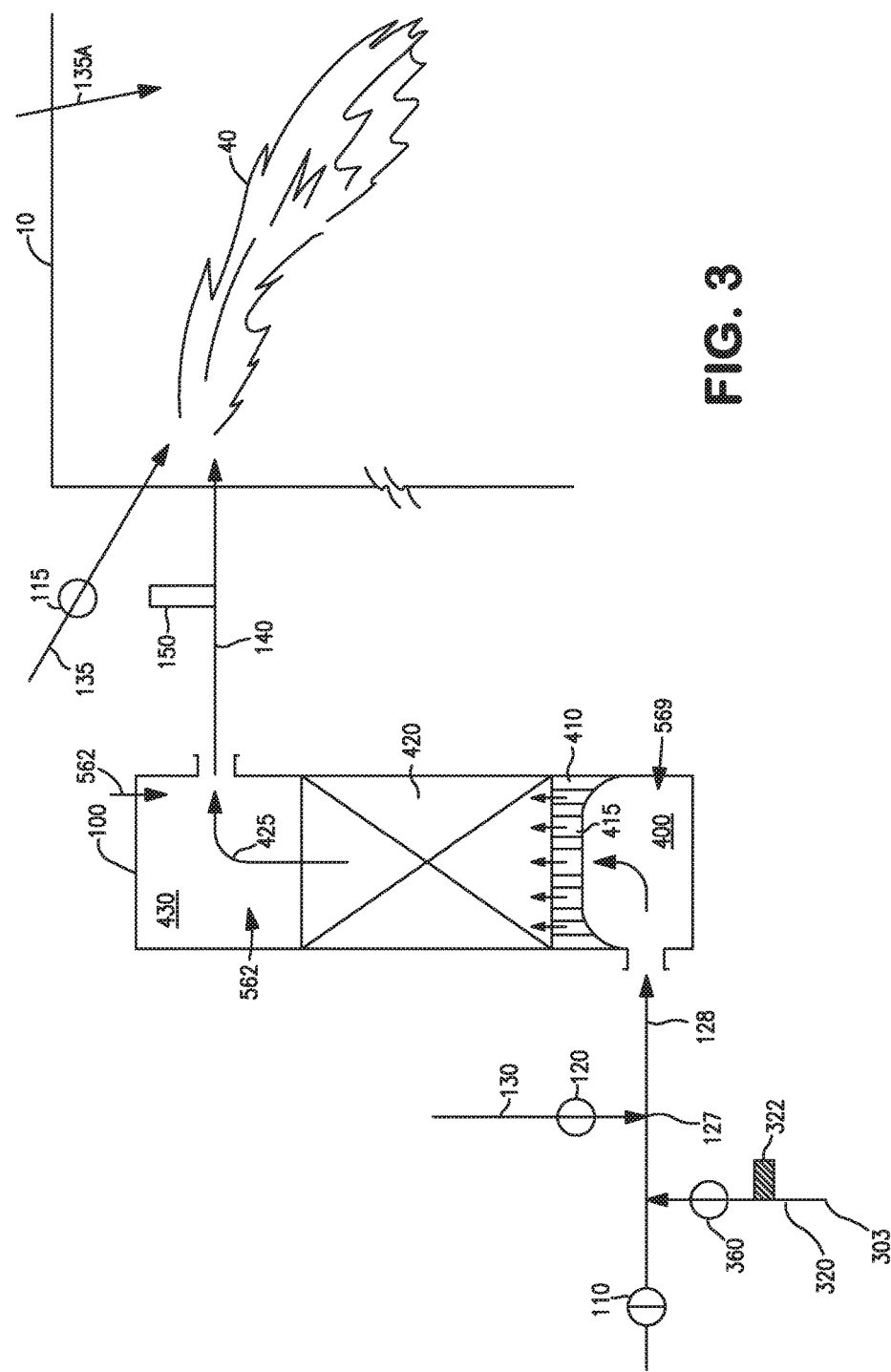

As seen in FIGS. 1 and 3, reforming fuel which is to be fed to the second regenerator (100) is supplied by a conduit (130) through valve (120). Suitable reforming fuels include methane (which is preferred) as well as any other combustible gas, gas mixture, or vaporized liquid fuels including, but not limited to, natural gas, propane, and LPG (liquefied petroleum gas).

As seen in FIG. 3, the reforming fuel (RF) from stream (130) intersects and mixes with the RFG (303) at location (127) in conduit (128) which also communicates with the bottom space (400) of regenerator (100). This RFG/RF mixture enters the already pre-heated checker pack (420) of regenerator (100) through gas passages (415) on arch (410). Regenerator (100) has already been heated in a previous cycle by passage of flue gas (containing oxygen) from the furnace into chamber (430) where, on the previous cycle, the flue gas was reacted with hydrocarbon fuel (562) fed into chamber space (430) in the manner described above with respect to regenerator (200) and chamber (530), followed by passage of the resulting reaction mixture product through checker pack (420) to heat checker pack (420), optionally followed by reaction with oxygen fed as (569) into space (400), again in the manner described above with respect to space (500).

The temperature of the RFG/RF mixture increases as it flows through the checker pack (420) of regenerator (100). When the temperature of the RFG/RF reaches reforming temperature, endothermic reforming reactions occur in which the reforming fuel (e.g. CH4) reacts with CO2 and H2O in the RFG and forms carbon monoxide, H2, other hydrocarbons and soot. The required heat for the endothermic reforming reactions is taken from the heated checkers. The reforming reaction continues as the RFG/RF mixture continues to travel toward the chamber (430). The gaseous stream (425) (referred to herein as a "reformed" or "syngas" gas stream) exits from the top of checker pack (420). Stream (425) has high temperature and may include species such as CO, $H_2$, soot, unreacted $CH_4$, and unreacted $CO_2$ and $H_2O$. The stream (425) passes through port neck (140) past oxygen sensor (150), and enters furnace (10). This stream exits checker pack (420) at temperatures for example ranging from 1800 F to 2500 F.

Oxidant for combustion of the syngas is supplied by a conduit (135) through opened valve (115). This oxidant can be air, or it can have an oxygen content higher than that of air, i.e. at least 21 vol. %, and preferably equal to or higher than 80 vol. %, more preferably equal to or higher than 90 vol. %, or even at least 99 vol. %.

Typically, the heat recovery process proceeds with one regenerator in the flue cycle and one regenerator in the reforming cycle, as seen in FIG. 1, for about 20 to 40 minutes or until the checkers in the reforming regenerator are too cold to provide sufficient heat to promote the desired endothermic chemical reactions. At that point, and now continuing with the description herein where regenerator (200) was in the flue cycle and regenerator (100) was in the reforming cycle, furnace (10) undergoes reversal in which regenerator (200) is transitioned to the reforming cycle for heat recovery and regenerator (100) is transitioned into the flue cycle for heat accumulation. Before the reversal, remaining syngas in regenerator (100) is to be purged to furnace (10). In this instance, reforming fuel supplied to the regenerator is terminated at first by closing valve (120) while letting the flow of RFG from blower (300) continue. Remaining syngas in regenerator (100) is purged by the RFG for a specified amount of time so that nearly all the syngas in the regenerator is expelled to the furnace and combusted to completion.

Upon reversal, the flue gas from the furnace passes into chamber (430) and, after conversion into the reaction mixture, passes through regenerator (100) and preferably oxidation in space (400). A portion of this product passes to exhaust (as defined herein) while a portion or the balance is mixed with fuel and the mixture is passed through regenerator (200) and into the furnace. Valve (110) which had been closed is opened, valve (210) is closed, and valve (360) is closed and valve (380) is opened, to permit heated flue gas to pass from regenerator (100) toward and through blower (300), and to permit a portion (303) of this flue gas to pass into regenerator (200) after it is mixed with reforming fuel (230) which enters through valve (220) which had been closed but now is opened. Valve (115) which had been open is closed, as no combustion aided by oxidant through valve (115) occurs in this phase, and valve (225) is opened. The resulting mixture of reforming fuel and treated recycled flue gas undergoes in regenerator (200) the endothermic reforming reactions which had occurred in regenerator (100) in the previous cycle as described herein, to produce stream (425) of syngas which passes into furnace (10) where it is combusted with oxidant (235) that is fed through valve (225). The possible and preferred oxygen compositions of oxidant (235) are as described above for oxidant (135).

During the heat recovery process, furnace (10) may be co-fired with other burners such as (60) and (65) such that both syngas flame (40) and burner flames (62) and (64) co-exist. In addition, burners (60) and (65) may or may not be firing during the reversal process when the reforming regenerator (i.e. (100) or (200)) as the case may be) is undergoing the purging sequence described above. For maximum heat recovery, it is preferred that burners (60) and (65) are not co-firing with the syngas flame (40). It is also preferred that during the purging sequence, burners (60) and (65) are not firing.

The operation and control of the present invention was described in preceding sections for an end-port fired glass furnace (10) fitted with two thermochemical regenerators in end wall (3) as an example. The present invention can alternatively be practiced in cross-fired furnaces equipped with multiple (typically three to seven) pairs of thermochemical regenerators of the present invention which are positioned on opposing sides of the furnace. The present invention can also be practiced in a furnace equipped with at least two thermochemical regenerators of the present invention and other burners and regenerators of different designs, including but not limited to air-fuel burners (by which is meant burners that combust fuel with air in the furnace) and air heating regenerators (by which is meant regenerators through which, in alternating cycles, flue gas is withdrawn from the furnace interior to heat the regenerator, and then air for combustion with fuel in the furnace is passed from outside the furnace through the heated regenerator into the furnace. However, when the present invention is practiced in a furnace that is also equipped with air heating regenerators or air-fuel burners, flue gases from the air-fuel burners and/or air regenerators mix with the flue gas from the thermochemical regenerators and dilute the concentration of CO2 and H2O in the flue gas entering into the thermochemical regenerators. In such a case the combined concentration of CO2 and H2O in the flue gas entering the thermochemical regenerators should be at least 35 vol. %, preferably greater than 50 vol. % in order to facilitate good reforming reactions in the reforming bed.

The present invention provides numerous benefits. Heat generated by the exothermic oxidization reactions that occur between the injected fuel (562) and the excess oxygen in the flue gas (50) that passes alternately into chambers (530) and (430) is stored in the upper portion of the respective checker packs (520) and (420). The present inventor unexpectedly found that this additional heat stored in the highest temperature zone of the checker pack is efficiently recovered during the reforming cycle due to rapid endothermic chemical reactions at high temperature. Separate energy balance calculations of the furnace and the regenerators indicate that 1 MMBtu of fuel injected and reacted with excess oxygen in the regenerators may reduce the fuel consumption in the furnace by more than 1 MMBtu depending on the thermal efficiency of the furnace. This surprising result can be explained by the following example. An oxy-fuel fired glass furnace with thermochemical regenerators has a fuel efficiency of 80% since 20% of the fuel input is lost in the sensible heat of flue gas after the regenerators. When 1 MMBtu of additional heat is recovered as the energy of syngas and introduced into the furnace, the fuel input required for the furnace is reduced by 1/0.8=1.25 MMBtu by the overall furnace energy balance. A separate thermochemical regenerator calculation indicates that more than 90% of 1 MMBtu (LHV) of fuel injected and reacted with excess oxygen in the regenerators may be stored and recoverable during the reforming cycle. In this example 0.9 MMBtu of recovered heat reduces the fuel input to the furnace by 0.9/0.8=1.125 MMBtu (LHV).

In addition, a portion of nitrogen oxides (also referred to as NOx) in flue gas stream (50) can be reduced in the regenerator (200) by chemical interaction with the injected fuel or with reducing atmosphere in chamber (530) and bed (520) (and similarly when the operation of the regenerators is reversed as described herein so that the flue gas (50) passes from the furnace into chamber (430) and regenerator (100)). When flue gas containing a high concentration of excess oxygen is recycled and mixed with fuel and passes into the regenerator that is in the reforming cycle, the excess oxygen reacts exothermically with fuel upon being heated in the checker pack before significant endothermic reforming reactions take place. This exothermic reaction heats the lower middle section of the checker pack.

In particular, for the case of full excess oxygen removal the present invention provides a reducing atmosphere in both regenerator beds, throughout both cycles (namely the flue cycle and the reforming cycle). This is in contrast to the expected situation in which each bed is alternatingly exposed to an oxidizing atmosphere when the bed is being operated in the flue gas cycle and then exposed to a reducing atmosphere when the bed is operated in the reforming cycle. This alternation of atmospheres (especially at the elevated temperatures employed in each cycle) would be expected to accelerate the aging and deterioration of the materials from which the checker beds and the regenerator walls as well as the port necks are constructed. The operator would thus have to use materials that are able to tolerate both kinds of atmospheres in addition to cyclic temperature changes of the gaseous streams which in contact with those materials; such materials would be more difficult to identify, and more expensive. The present invention by providing reducing atmosphere in both cycles reduces the risk of deterioration from changes between reducing and oxidizing atmospheres, and allows the operator more freedom of choice of more affordable checker materials which tolerate reducing atmosphere without also having to tolerate oxidizing atmospheres.

Example

The effectiveness of the present invention for the case of full excess oxygen removal is illustrated in this example and in the accompanying table below (which are provided for purposes of illustration and not limitation).

A 380 ton/day air regenerator glass furnace was converted to oxy-fuel firing with the thermal-chemical heat recovery (TCR) process as described above. After the conversion, there were two TCR regenerator chambers on each side of the furnace breast walls.

The total flue gas flow entering the TCR chamber in the flue gas heating cycle was calculated to be 269,562 scfh, based on the results of a separate mass and energy balance model. The flue gas was assumed to be at 2700 F and had gas compositions as shown in Table 1. Excess oxygen in the flue gas was 0.80% wet. To burnout all excess O2 in the flue gas and also to provide an overall fuel-rich reducing conditions for the checkers, a total of 1082 scfh of the methane fuel was required to be injected into and mixed with the hot flue gas exhaust.

The fuel injection was carried out by two lances with each lance having one injection nozzle. The nozzle orifice size was 0.25 inch ID, therefore, the fuel injection velocity was about 441 ft/sec. After completing the injection, the injected fuels combusted with the flue gas excess O2 so that all the excess oxygen was removed. The flue gas temperature thus increased to 2768 F, representing a 68 F temperature rise. Flue gas flow rate and its composition after the fuel injection is also shown in Table I. As can be seen, the flue gas in the plenum above the checker top was now in reducing conditions which had a very small amount of excess fuel at 40 ppm and a CO concentration of 2000 ppm. Computational Fluid Dynamics (CFD) software may be used to optimize the locations and design of the fuel injections.

In the final burnout zone and as indicated in Table I, stoichiometric oxygen flow required for CO and residual fuel burnout was calculated to be 292 scfh. Since complete mixing of this oxygen with the flue gas is essential for ppm levels of CO burnout, the amount of the oxygen flow for CO burnout was increased from 292 scfh to 1087 scfh, which corresponded to an excess O2 of 0.4% after the CO burnout zone, in order to amplify the momentum of the oxygen jet for mixing. If the flue gas temperature near the checker's arch area were too low for CO burnout with the injection of the cold oxygen, a hot oxygen lance may be installed to reduce the CO concentrations to less than or much less than 200 ppm in order to comply with CO emissions regulations.

TABLE 1

| FLUE GAS | | |
|---|---|---|
| Port neck | Total Flue Gas Flow Rate (scfh) | 269562 |
| | Flue Gas Temperature (F.) | 2700 |
| | Flue Gas Composition | |
| | CO2 (% WET) | 38.89 |
| | H2O (% WET) | 52.22 |
| | N2 (% WET) | 6.01 |
| | O2 (% WET) | 0.80 |
| | Ar (% WET) | 2.09 |
| | Flue Gas Velocity (ft/sec) | 30 |
| | Total Flue Mass Rate (lbm/hr) | 20798 |
| FUEL INJECTION | | |
| Chamber above checker top | Fuel (CH4) required to reach slightly fuel rich condition (scfh) | 1082 |
| | Number of Nozzles | 2 |
| | Fuel Flow per Nozzle (scfh) | 541 |
| | Nozzle Diameter (inch) | 0.25 |
| | Fuel velocity (ft/sec) | 441 |
| | Total Fuel Mass Rate (lbm/hr) | 46 |
| AFTER FUEL INJECTION | | |
| Chamber above | Flue Gas Temperature (F.) | 2768 |

TABLE 1-continued

| checker top | | |
|---|---|---|
| | Total Flue Gas Flow Rate (scfh) | 270677 |
| | Flue Gas Composition | |
| | CO2 (% WET) | 38.93 |
| | H2O (% WET) | 52.80 |
| | N2 (% WET) | 5.98 |
| | O2 (% WET) | 0.00 |
| | Ar (% WET) | 2.08 |
| | CH4 (ppm WET) | 40 |
| | CO (ppm WET) | 2000 |
| CO BURNOUT | | |
| Arch | O2 required at SR = 1 (scfh) | 292 |
| | Flue gas excess O2 (%) | 0.4 |
| | Required O2 flow (scfh) | 1087 |

What is claimed is:

1. A method of carrying out combustion in a furnace, comprising
(A) combusting fuel in a furnace to produce gaseous combustion products which contain oxygen; and
(B) alternately
(1) (i) passing a portion of the gaseous combustion products out of the furnace into a first chamber, feeding hydrocarbon fuel into the first chamber, and reacting the hydrocarbon fuel in the first chamber with oxygen present in the gaseous combustion products to reduce the concentration of oxygen in the first chamber and to produce a gaseous reaction mixture containing oxygen and from zero up to 20,000 ppm of carbon monoxide;
(ii) passing the gaseous reaction mixture out of the first chamber into and through a cooled first regenerator to heat the first regenerator and cool said gaseous reaction mixture;
(iii) passing at least part of said cooled gaseous reaction mixture from said first regenerator, and fuel, into a heated second regenerator and, in the second regenerator, reacting the gaseous reaction mixture and the fuel in an endothermic reaction in the second regenerator to form syngas comprising hydrogen and CO; and
(iv) passing said syngas formed in the second regenerator into said furnace and combusting the syngas with one or more oxidant streams injected into said furnace; and
(2) (i) passing a portion of the gaseous combustion products out of the furnace into a second chamber, feeding hydrocarbon fuel into the second chamber, and reacting the hydrocarbon fuel in the second chamber with oxygen present in the gaseous combustion products to reduce the concentration of oxygen in the second chamber and to produce a gaseous reaction mixture containing oxygen and from zero up to 20,000 ppm of carbon monoxide;
(ii) passing the gaseous reaction mixture out of the second chamber into and through a cooled second regenerator to heat the second regenerator and cool said gaseous reaction mixture;
(iii) passing at least part of said cooled gaseous reaction mixture from said second regenerator, and fuel, into a heated first regenerator and, in the first regenerator, reacting the gaseous reaction mixture and the fuel in an endothermic reaction in the first regenerator to form syngas comprising hydrogen and CO; and
(iv) passing said syngas formed in the first regenerator into said furnace and combusting the syngas with one or more oxidant streams injected into said furnace.

2. The method of claim 1 wherein the gaseous combustion products that are passed alternately into the first and second chambers in steps (B)(1)(i) and (B)(2)(i) contain more than 5 vol. % of oxygen, and the gaseous reaction mixture that is formed alternately in the first and second chambers contains up to 5 vol. % of oxygen and contains from zero up to 3000 ppm of carbon monoxide.

3. The method of claim 2 wherein the gaseous reaction mixture that is formed alternately in the first and second chambers contains 0.5 to 2.0 vol. % of oxygen.

4. The method of claim 1 wherein the gaseous reaction mixture that is formed alternately in the first and second chambers in steps (B)(1)(i) and (B)(2)(i) contains less than 20,000 ppm of oxygen and at least 1000 ppm of carbon monoxide.

5. The method of claim 4 wherein the gaseous reaction mixture that is formed alternately in the first and second chambers in steps (B)(1)(i) and (B)(2)(i) contains less than 1,000 ppm of oxygen and 1,000 to 50,000 ppm of carbon monoxide.

6. The method of claim 1 wherein the cooled gaseous reaction mixture that is passed from the first regenerator, or from the second regenerator, or from both regenerators, is reacted with oxygen to reduce the amount of carbon monoxide and hydrocarbons present therein.

7. The method of claim 6 wherein the said reaction with oxygen reduces the amount of carbon monoxide in the cooled gaseous reaction mixture to less than 500 ppm.

8. The method of claim 6 wherein the said reaction with oxygen reduces the amount of carbon monoxide in the cooled gaseous reaction mixture to less than 200 ppm.

9. The method of claim 6 wherein the said reaction with oxygen reduces the amount of carbon monoxide in the cooled gaseous reaction mixture to less than 100 ppm.

10. The method of claim 1 wherein the combustion in the furnace in steps (A) and (B) is carried out with oxidant comprising at least 50 vol. % oxygen.

11. The method of claim 1 wherein the combustion in the furnace in steps (A) and (B) is carried out with oxidant comprising at least 80 vol. % oxygen.

12. The method of claim 1 wherein the furnace is also heated by combustion at one or both of air-fuel burners and/or air-heating regenerators.

13. The method of claim 12 wherein the combined concentration of CO2 and H2O in the flue gas entering the thermochemical regenerators is at least 35 vol. %.

14. The method of claim 12 wherein the combined concentration of CO2 and H2O in the flue gas entering the thermochemical regenerators is greater than 50 vol. %.

* * * * *